(12) United States Patent
Yanai et al.

(10) Patent No.: US 6,206,398 B1
(45) Date of Patent: Mar. 27, 2001

(54) STRUCTURE OF A REAR SWINGARM FOR A VEHICLE WITH SADDLE SEAT

(75) Inventors: Hideo Yanai; Shinichi Yamada, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/392,576

(22) Filed: Sep. 9, 1999

(30) Foreign Application Priority Data

Sep. 30, 1998 (JP) .................................................. 10-278638

(51) Int. Cl.[7] ..................................................... B62K 11/04
(52) U.S. Cl. ........................ 280/284; 280/288; 280/288.3
(58) Field of Search ................................... 280/284, 288, 280/282, 288.3, 288.2, 285

(56) References Cited

U.S. PATENT DOCUMENTS

| | | | |
|---|---|---|---|
| 4,775,025 | * 10/1988 | Parker et al. | 180/219 |
| 5,452,911 | * 9/1995 | Klein et al. | 280/288 |
| 5,476,278 | * 12/1995 | Levin et al. | 280/288 |

FOREIGN PATENT DOCUMENTS

| | | | |
|---|---|---|---|
| 2-286486 | * | 11/1990 | (JP) . |
| 3-42392 | * | 2/1991 | (JP) . |
| 4-243679 | * | 8/1992 | (JP) . |
| Y26316 | | 1/1994 | (JP) . |

* cited by examiner

*Primary Examiner*—Brian Johnson
*Assistant Examiner*—Avraham H. Lerner
(74) *Attorney, Agent, or Firm*—Birch, Stewart, Kolasch & Birch, LLP (57) ABSTRACT

A rear swingarm is made by casting an aluminum alloy having a front cross member with pivots at a front end thereof, a rear cross member having axle holders at the rear end thereof, and a pair of hollow arms connecting the front and rear cross members along the length of a buggy. The rear swingarm has an opening for cut-away excess metal, which is in the shape of an egg when viewed from above. A front wall, an inner wall and a rear wall, constituting the opening, are rounded with curvatures R1, R2 and R3, respectively. The inner wall is uniformly rounded with the curvature R2. A width of the arms is gradually increased from the front end thereof toward the rear end of the buggy.

16 Claims, 8 Drawing Sheets

STRUCTURE OF A REAR SWINGARM FOR A VEHICLE WITH SADDLE SEAT

BACKGROUND OF THE INVENTION

1. Field of the Invention

This invention relates to a structure of a swingarm for a four-wheeled buggy or the like having a saddle seat.

2. Background Art

Japanese Utility Model Publication No. Hei 6-316 discloses a swingarm for a four-wheeled buggy. Front and rear cross members of the swingarm are formed by conventional casting methods and are welded together via a pair of right and left arm members. The front and rear cross members and the right and left arm members, when welded together, define a hexagonal opening in the body of the swingarm.

Generally, in a four-wheeled buggy, a rear swingarm supports right and left rear wheels via an axle which extends across a rear part of the rear swingarm. Such a design provides the rear swingarm with a large torsional rigidity. However, the torsional rigidity is not uniform along the length and width of the rear swingarm. The torsional rigidity should be largest near the front and rear cross members, and gradually become less toward the center of the rear swingarm.

If the right and left arm members are made of pipe material, as demonstrated in the related art, they are unable to cope with the required variations in torsional rigidity; therefore, the conventional rear swingarm must be constructed with a heavy material, and thus the swingarm cannot avoid having higher rigidity than would normally be necessary. Furthermore, when the arm members are assembled by welding, the design of the conventional rear swingarm requires the length of the welded portions of the arm members to be unnecessarily increased which causes an undesirable increase in manufacturing cost.

Additionally, due to the hexagonal opening of the swingarm of the conventional art, the arm members inevitably need to be reinforced using reinforcing patches along points where welding is to occur. In such a case, the foregoing discussed problems are much more pronounced. Moreover, an increase in the weight of the rear swingarm is observed due to the use of the reinforcing patches. The present invention is intended to provide a rear swingarm for a saddle seat vehicle which can overcome the foregoing problems of the related art and can be easily manufactured.

SUMMARY OF THE INVENTION

In order to solve the foregoing problems, the present invention provides a structure of a rear swingarm which is used for a vehicle with a saddle seat, and which is swingably supported at the front end thereof by a body frame, and supports rear wheels at the rear end thereof The rear swingarm is constituted by a cast light alloy as a single member, and has an opening for cut-away excess metal at the center thereof. A front cross member is provided in front of the opening, and a rear cross member is provided behind the opening. A pair of right and left hollow arms connect the front end rear cross members.

The front and rear cross members and the arms of the rear swingarm surround the opening for cut-away excess metal. The opening is wider near the front cross member as compared with the opening width near the rear cross member. Right and left parts of the opening constituting the inner wall of the right and left arms are uniformly rounded, and the width of the arms is gradually increased from the front part to the rear part thereof.

The arms have sectional areas which vary in accordance with the distribution of the required rigidity of the rear swingarm along the length thereof. The rear swingarm of the present invention is designed a varying sectional area which has been found to be difficult to achieve when the rear swingarm arms are made of extruded pipes, or the like, as in the conventional art.

The arms of the rear swingarm of the present invention have sufficient and required rigidity along the entire length thereof. Therefore, a predetermined required torsional rigidity is satisfied for each manufactured rear swingarm produced using the concept of the present invention. Furthermore, the present invention achieves a product which is significantly lighter than that of the conventional swingarm; thus, achieving an increase in performance of a vehicle the swingarm of the present invention is implemented on.

In addition, since the rear swingarm is cast as one integral member, it is not necessary to weld the front and rear cross members and arms, as compared to the situation in the related art where these members are separately formed and welded in order to make them integral. Furthermore, the side wall of the opening for cut-way excess metal is uniformly rounded so as to constitute the arms of the swingarm. This allows the inner walls of the hollowly formed arms to vary smoothly. Such a construction facilitates removal from sand molds when forming the hollow arms. As a result, the rear swingarm can be simply manufactured, while achieving a product of significant superiority over the conventional rear swingarm design.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The invention will be described with reference to an embodiment of the present invention, as it is applied to a four-wheeled buggy, shown in the accompanying drawings. However, it will be readily ascertained by those of ordinary skill in the art that the present invention may be implemented with various other vehicle frame and body types which have not been described herein.

Figure 2:
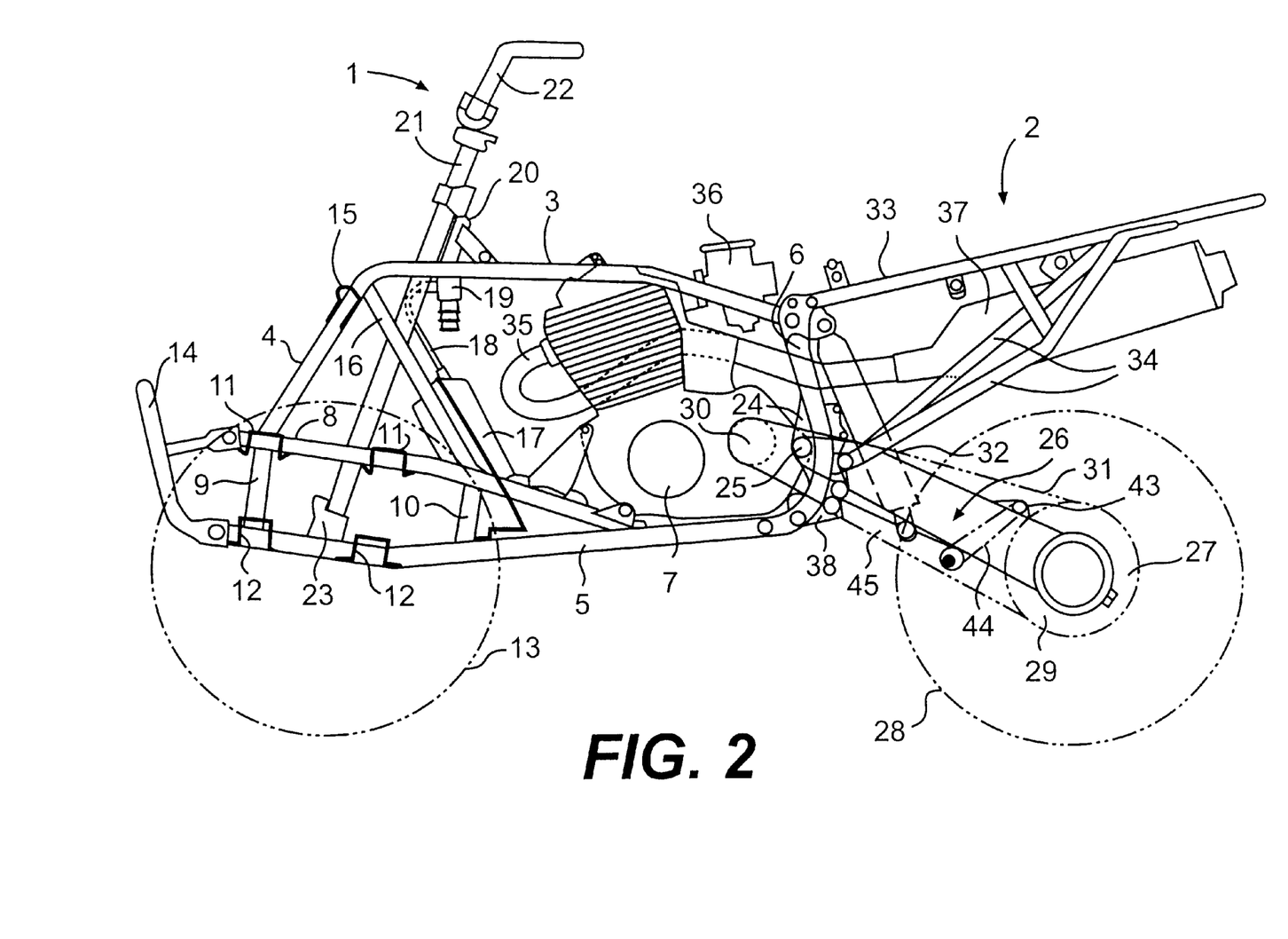
FIG. 2 is a side view of a buggy having a rear swingarm in accordance with an embodiment of the present invention.
Figure 3:
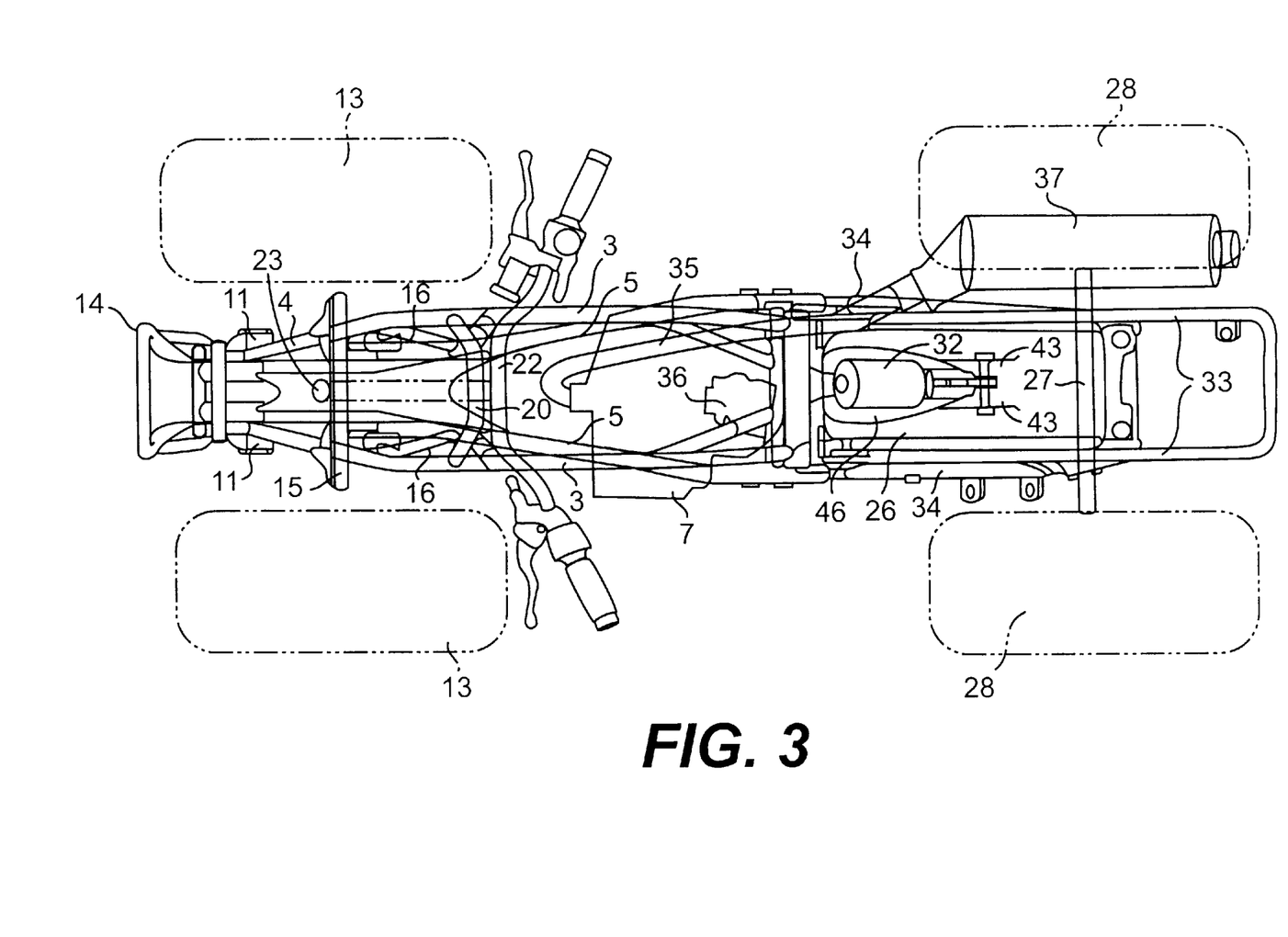
FIG. 3 is a top plan view of the buggy having a rear swingarm in accordance with an embodiment of the present invention.

Referring to FIGS. 2 and 3, the buggy includes a pair of front frames 1 and a pair of rear frames 2, each of which have been sub-assembled beforehand. Specifically, each of the front frames 1 is constituted by a main frame 3, a front down frame 4, a lower frame 5 and a center frame 6. Each of the front frames 1, and their respective members, is arranged in a loop shape. The front frames 1 support an engine 7 being positioned therebetween.

Each main frame 3 extends over the engine 7 and traverses the longitudinal length of the buggy. Each front down frame 4 extends obliquely downward from the front end of the main frame 3, and is welded to the front part of a reinforcing member 8 that is obliquely arranged above the lower frame 5.

Front ends of each of the lower frames 5 are coupled using a front pipe 9. An intermediate pipe 10 communicates between intermediate openings for cut-away excess metal of a reinforcing member 8 and the lower frame 5. The rear end of reinforcing member 8 is directly welded to the center of the lower frame 8, under the engine 7.

Coupling brackets 11 and 12 of upper and lower arms (not shown) are provided on the reinforcing member 8 and the lower frame 5. The upper and lower arms constitute a pair of double wishbone type front suspensions for supporting a pair of front wheels 13.

A bumper 14 extends between the front ends of the reinforcing members 8 and the front ends of the lower frames 5. A stay 15 is provided near bent portions where each of the main frames 3 change to the front down frames 4, thereby supporting an upper end of a shock absorber (not shown) of the front suspension.

Reinforcing pipes 16 extend obliquely downward from the vicinity of the stay 15 toward a position where the reinforcing member 8 and the intermediate pipe 10 are connected. The reinforcing pipe 16 supports an oil tank 17 (not shown in FIG. 3).

The oil tank 17 is positioned in front of the engine 7, and is surrounded by the right and left reinforcing pipes 16, reinforcing members 8, lower frames 5 and so on, and is connected to an oil cooler 19 via a tube 18 which is suspended from the main frame 3 above the oil tank 17 (not shown in FIG. 3).

A stay 20 is provided on the main frames 3 near the oil cooler 19 and a steering shaft 21. A steering handle bar 22 is attached to the top of the steering shaft 21. The steering shaft 21 has its lower end received in a bearing 23 on the lower frame 5. A tie rod (not shown) is coupled to the lower frame 5 near the bearing 23.

The rear end of each lower frame 5 extends rearward under the engine 7 and is bent upward near the rear end of the engine 7 to connect to the center frame 6. A pivot plate 24 is welded to the lower front part of the center frame 6, so that the front end of each rear swingarm 26 is swingably coupled to the center frame 6 via a pivot shaft 25.

The rear swingarm 26 extends rearward from the pivot shaft 25, and supports at the rear end thereof the center of an axle 27. The axle 27 supports the rear wheels 28 at opposite ends thereof. The rear wheels 28 are driven by chains 31 stretching around driven sprockets 29 and drive sprockets 30 of the engine 7. These sprockets are coaxial. A shock absorber 32 for the rear suspensions is provided between the rear swingarm 26 and the front frames 1.

In order to support a seat, the rear frames 2 include a pair of right and left seat rails 33 extending rearward from the rear ends of the main frames 3, and a pair of right and left rear stays 34 extending obliquely between the rear part of the seat rails 33 and the lower part of the center frames 6. Also shown in FIG. 2 is an exhaust pipe 35, a carburetor 36, and a muffler 37.

Figure 4:
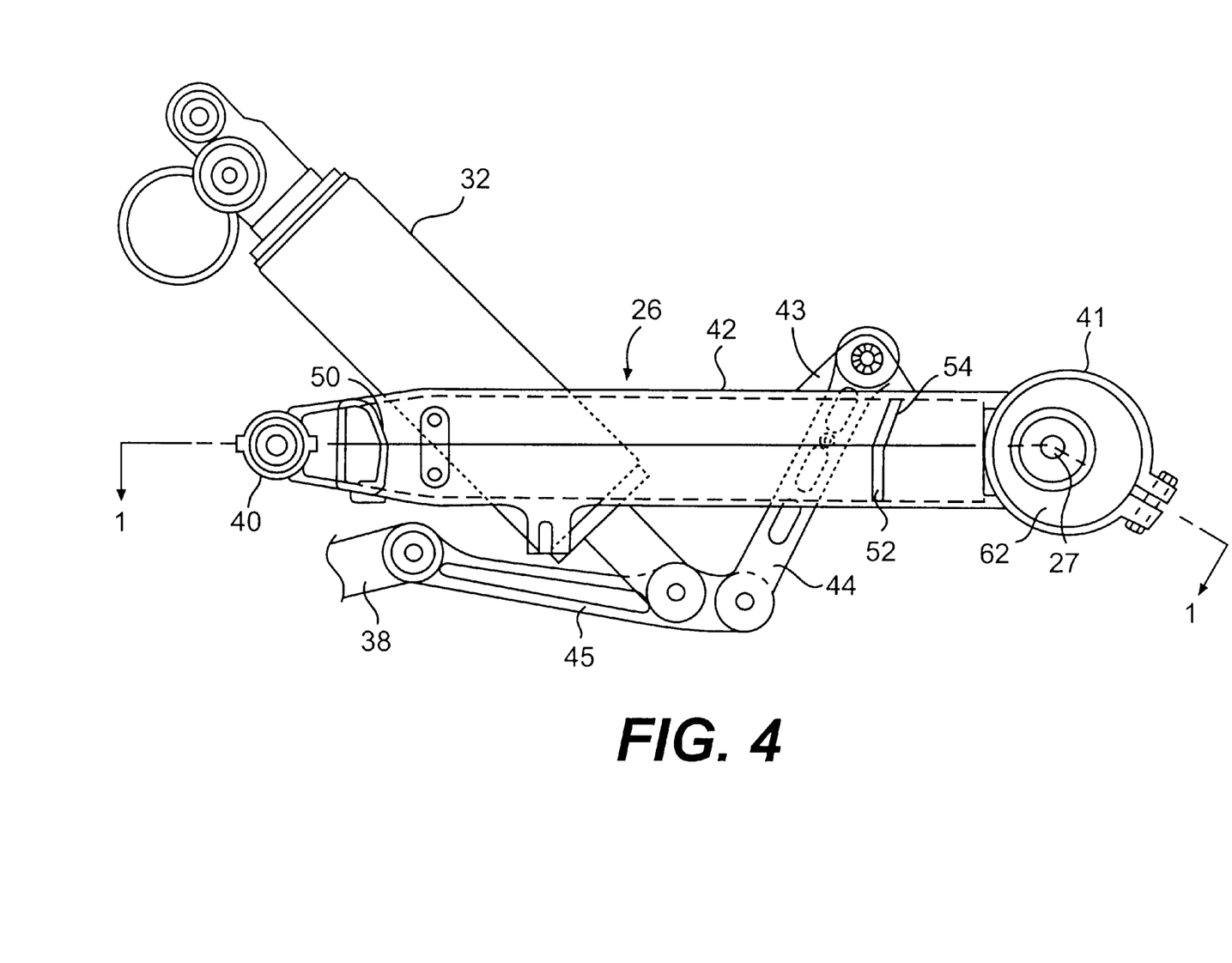
FIG. 4 is a side view of the rear swingarm.

The structure of the rear swingarm 26 will now be described in detail. Referring to FIG. 4 showing the side cross-sectional view of the rear swingarm 26 together with the shock absorber 32, the rear swingarm 26 has a pair of pivot sections 40 supported by the pivot shaft 25 at the front part thereof, a pair of axle holders 41 at the rear end thereof, and a pair of arms 42 extending between the pivot sections 40 and the axle holders 41.

A link stay 43 is provided on the rear upper part of each arm 42. The front end of a rear link 44 whose one end is pivotally coupled to the link stay 43 is pivotally coupled to the rear end of a front link 45. The front end of the front link 45 is pivotally coupled to a body frame part 38. The lower end of the shock absorber 32 passing through an opening 46 for cut-away excess metal (to be described later) is pivotally coupled to the center of the front link 45.

As shown in FIG. 1 and FIGS. 5 to 8, the rear swingarm 26 is manufactured by casting an aluminum alloy or a like material, and is shaped as a single hollow member, which includes a front cross member 47, a rear cross member 48, and a pair of right and left arms 42.

Figure 1:
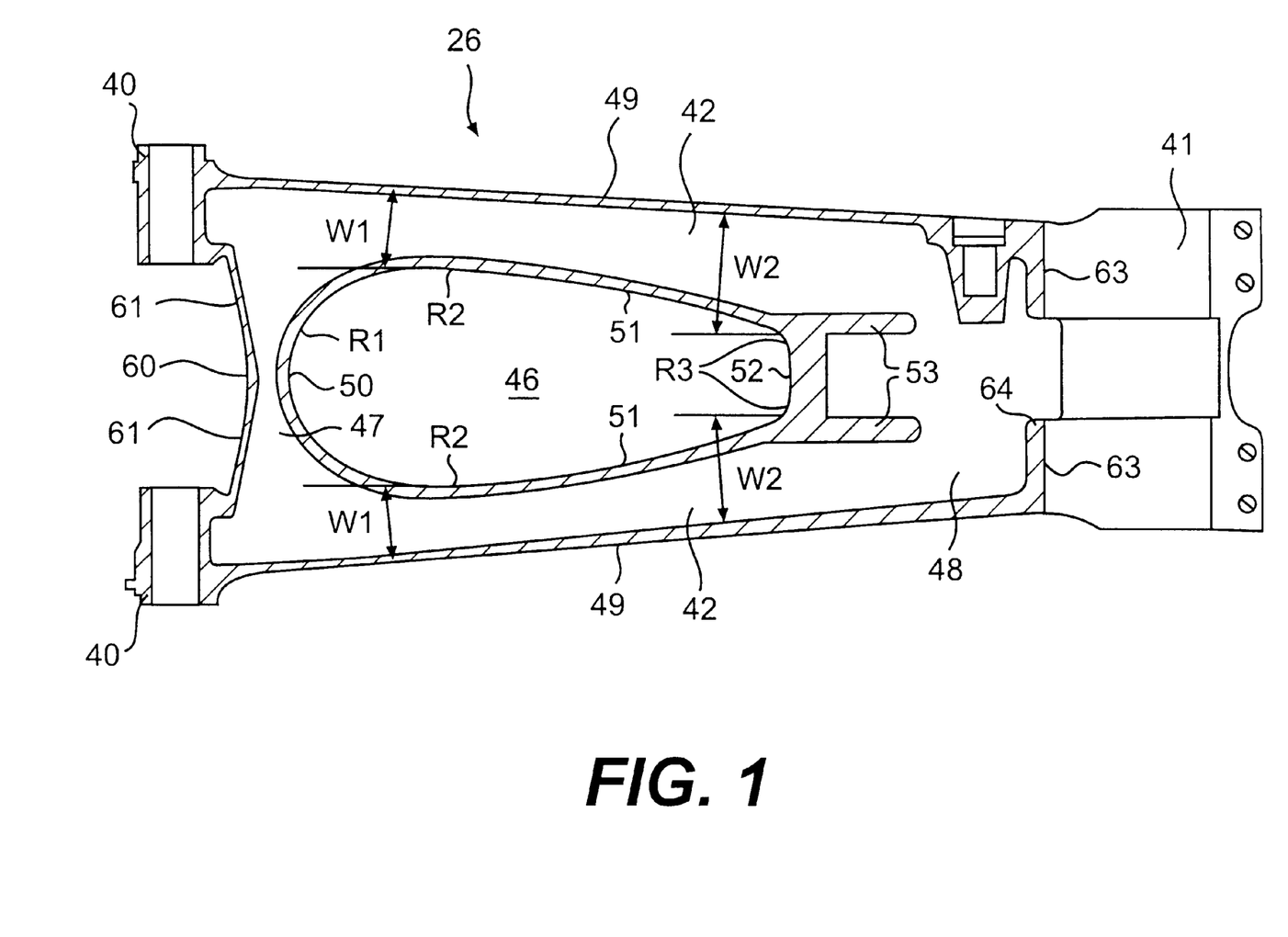
FIG. 1 is a top cross-sectional view of the rear swingarm.
Figure 5:
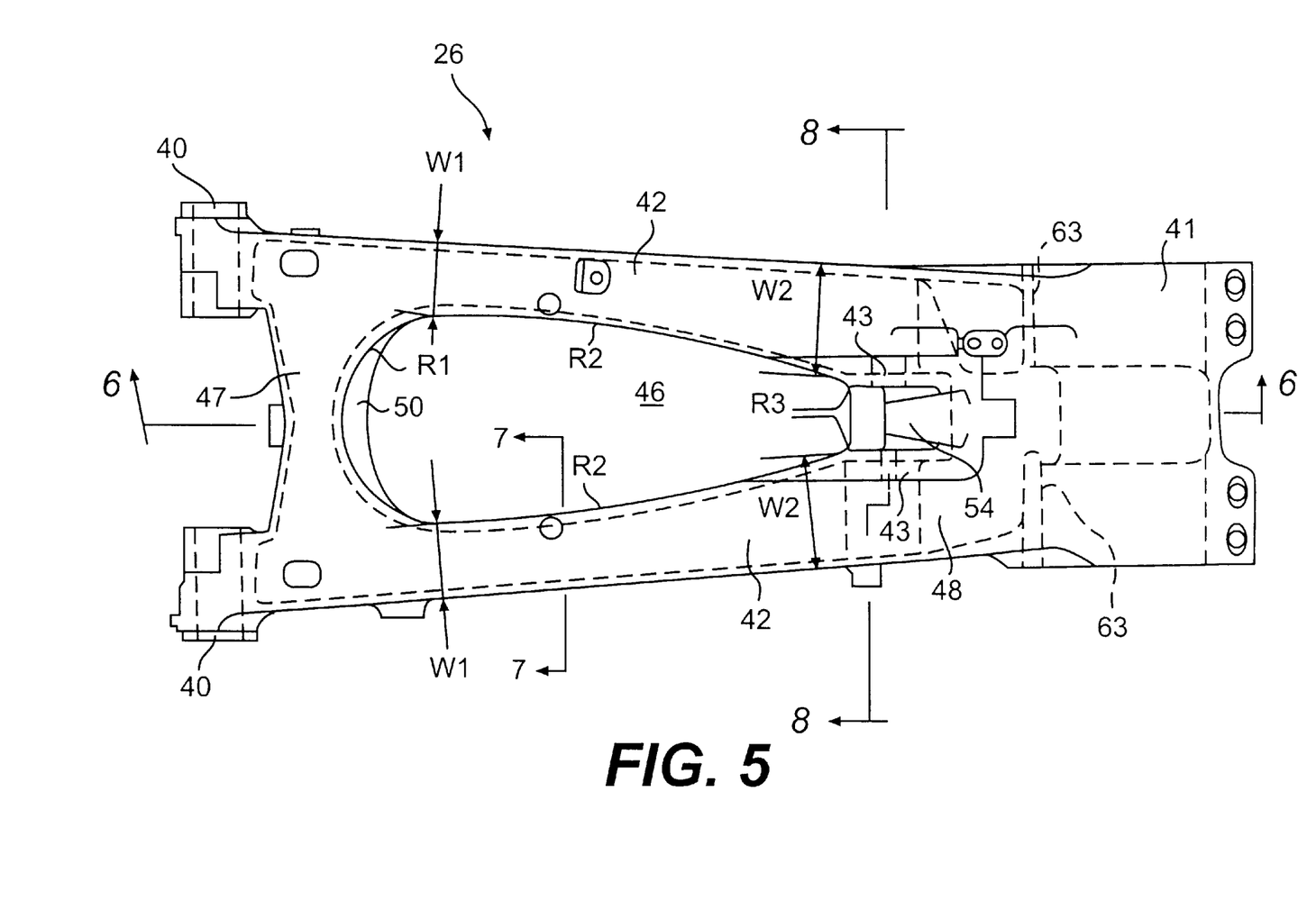
FIG. 5 is a top plan view of the rear swingarm.
Figure 6:
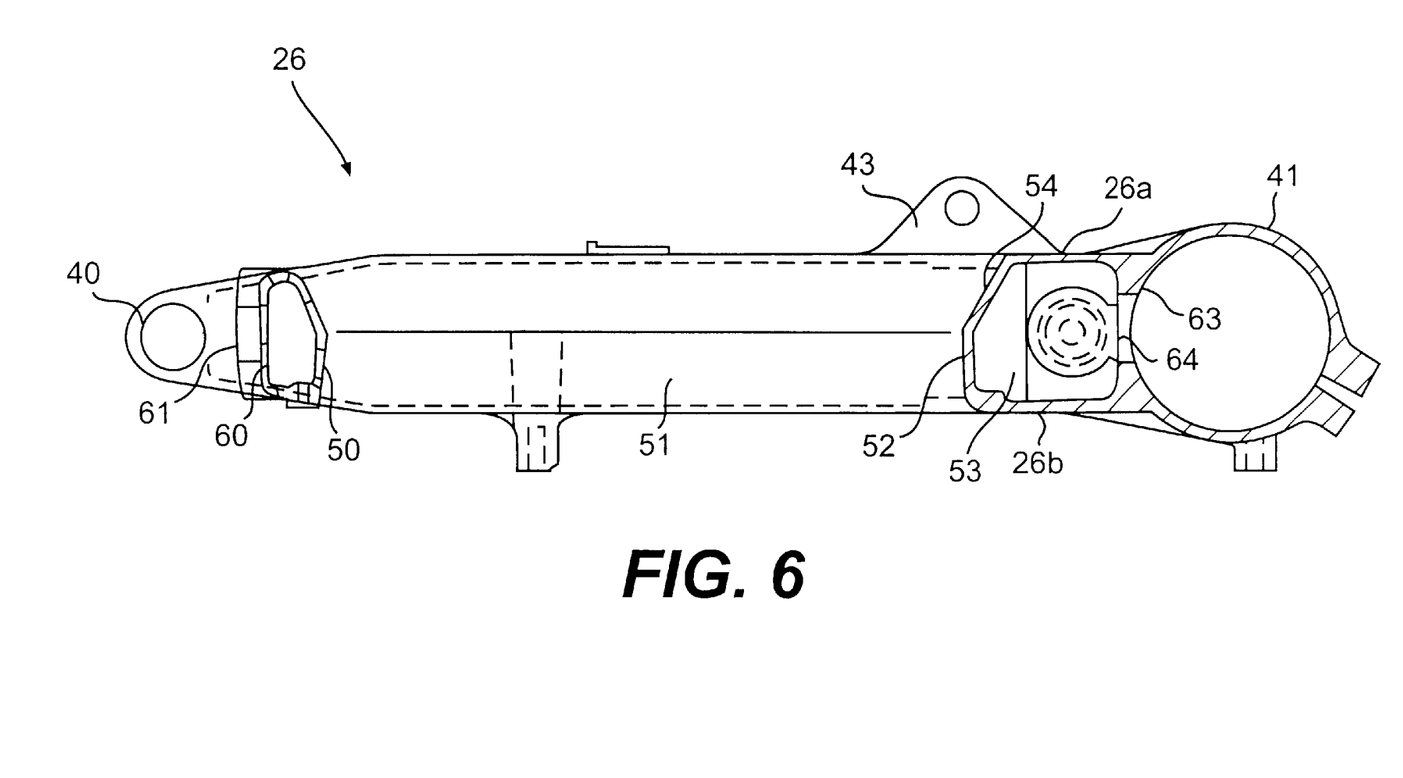
FIG. 6 is a longitudinal cross-sectional view of the rear swingarm, taken along line 6—6 shown in FIG. 5.

The opening 46 for cut-away excess metal is substantially oval or egg shaped when viewed from above, and vertically extends through the rear swingarm 26. A front wall 50, an inner wall 51 and a rear wall 52 constituting a peripheral wall of the opening 46 is smoothly and uniformly curved. The front wall 50 has a curvature R1, the inner wall 51 has a curvature R2, and the rear wall 52 has a curvature R3, satisfying R2>R1>R3.

However, the rear wall 52 is not uniformly curved, but is substantially straight at its center where right and left link stays 43 are provided. In this embodiment, the curvature R3 denotes the curvature of the rear wall 52 except for the straight portion thereof. The rear wall 52 having the curvature R3 smoothly connects to the inner walls 51 having the curvature R2.

A pair of right and left reinforcing ribs 53 extend from the substantially straight portion of the rear wall 52 in parallel to and under the right and left link stays 43 toward the rear part of the buggy, or toward the rear part of the rear swingarm 26. The reinforcing ribs 53 connect upper and lower surfaces 26a and 26b of the rear swingarm 26, thereby reinforcing the right and left link stays 43 (see FIG. 8). The upper part of the rear wall 52 at its straight portion extends obliquely upward and rearward between the link stays 43, thereby forming a slope 54 which functions as run off for the rear link 44.

The curvatures (R1, R2 and R3) of the foregoing walls are equal on both sides of the opening 46. A first region where the portions having the curvatures R1 and R2 connect with each other serves as the front part of the arms 42. The width of the opening 46 is maximum at the first region. On the other hand, a second region where the portions having R2 and R3 connect with each other serves as the rear part of the arms 42. The width of the opening 46 is much smaller at the second region than that at the first region.

Figure 7:
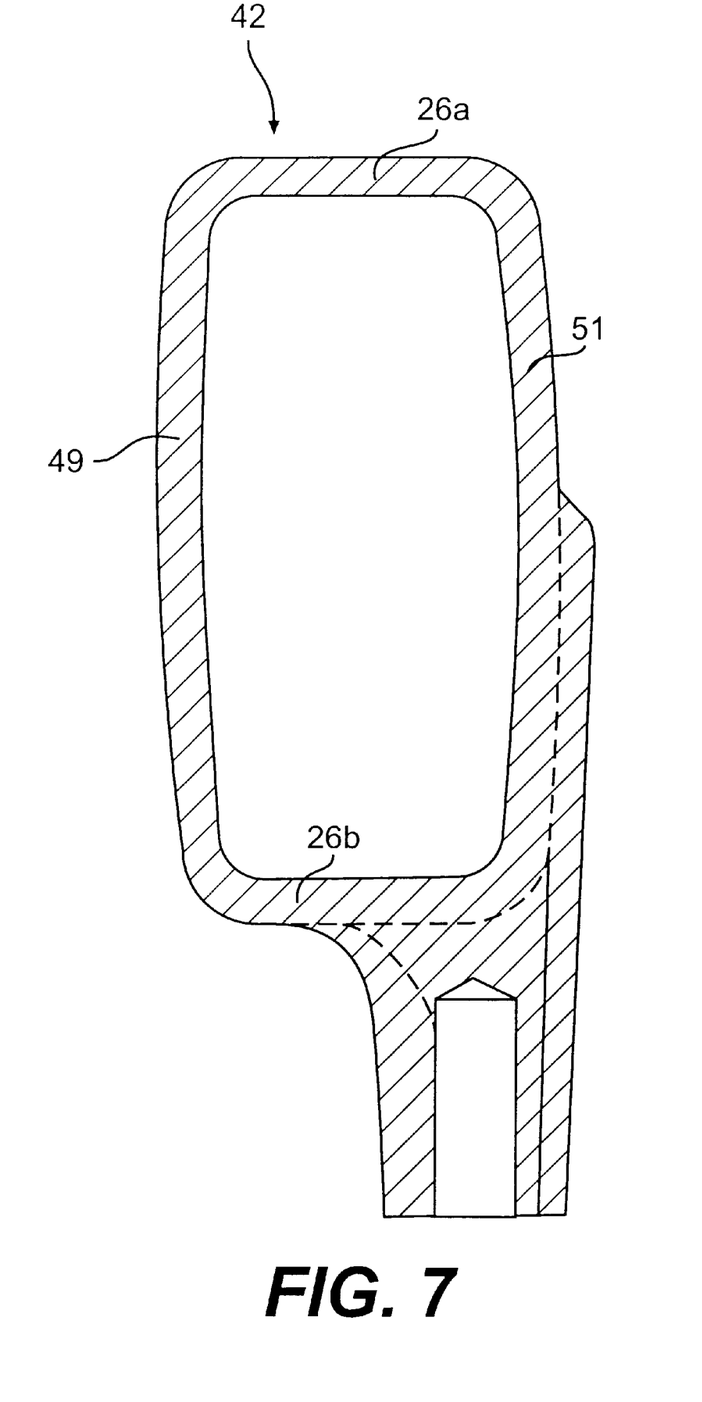
FIG. 7 is a cross-sectional view taken along line 7—7 shown in FIG. 5.
Figure 8:
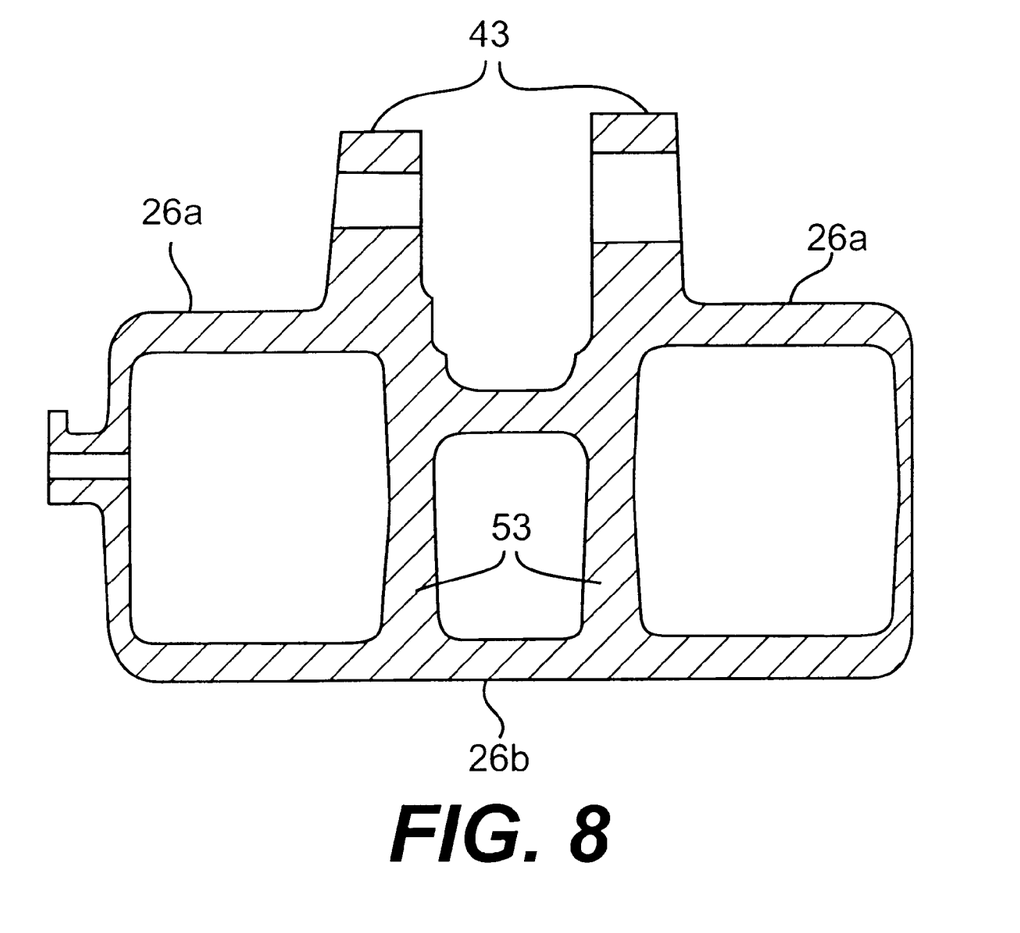
FIG. 8 is a cross-sectional view taken along line 8—8 shown in FIG. 5.

The arms 42 connect the front and rear cross members 47 and 48 along the length of the swingarm 26, and have a hollow space defined by the inner wall 51, outer wall 49, and upper and lower surfaces 26a and 26b of the rear swingarm 26 (see FIG. 7).

The right and left arms 42 are symmetrical around the center of the buggy, with the inner wall 51 uniformly rounded, so that the arms 42 gradually become wider toward the rear ends thereof. Therefore, a width (W1) at the front part is minimum while a width (W2) at the rear part is essentially minimum (see FIG. 1).

The arms 42 have a substantially equal height along the length thereof. In short, the cross sectional area of each arm 42 is gradually increased from the front part to the rear part thereof.

In the rear swingarm 26 of an embodiment of the present invention, the front cross member 47 connects to the front parts of the arms 42, is hollow, and has a pair of pivots 40 extending therefrom. The pivots are integral with the first cross member 47.

Bearings for the pivot shaft 25 are fitted in the pivots 40. A front surface 60 of the front cross member 47 connecting the pivots 40 has a slope in the shape of a V with the apex thereof facing rearward of the buggy, or towards the rear of the rear swingarm, and has sand mold removal holes 61. These holes 61 extend through the front cross member 47.

The rear cross member 48 connects the rear ends of the arms 42, is hollow, and has a pair of axle holders 41 as integral parts at the rear end thereof. The axle holders 41 are substantially cylindrical, and extend through the rear cross member 48 along the length thereof. An eccentricity adjuster 62 is rotatably housed in the axle holders 41 in order to adjust a position of the axle 27 along the length of the buggy.

As clearly shown in FIG. 1, a sand mold removal hole 64 is formed at the center of a front partition 63 constituting the axle holders 41. The axle holders 41 at the rear cross member 48 communicate with the hollow spaces in the arms 42 via the sand mold removal hole 64. The axle holders 41 have open right and left ends, so that the hollow spaces in the rear swingarm 26 are open to the outside via the hole 64.

The hollow spaces in the arms 42 communicate with the hollow space in the front cross member 47 while the hollow space in the front cross member 47 directly opens to the exterior via the sand mold removal holes 61 formed on the V shaped slope.

The rear swingarm 26 in this embodiment operates as follows. The rear swingarm 26 has the opening 46 substantially in the shape of an egg. The inner wall 51 of the opening 46 is uniformly rounded so that the width of the arms 62 gradually increases from the front end (having the minimum width W1) of the front cross member 47 toward the rear end (haying the maximum width W2) near the rear wall 52.

Therefore, rigidity of the arms 42 gradually and sequentially increases from the connecting part with the front cross member 47 to the connecting part with the axle holders 41. This gradual increase of the width agrees with the distribution of rigidity that is necessary for the respective parts of the arms 42 along the length of the rear swingarm 26.

The rear swingarm 26 of the four-wheeled buggy is required to have a large torsional rigidity. For this purpose, the rear swingarm 26 has a wall thickness to assure sufficient rigidity at its respective parts without becoming excessively heavy. Therefore, the swingarm 26 can not only maintain necessary rigidity but also accomplish the manufacturing desirability of having significant weight reduction.

Furthermore, due to the arms 42 and the inner wall 51 having the curvature R2 which smoothly connects at the front and rear ends thereof to the front wall 50 having the curvature R1 which connects to the rear wall 52 having the curvature R3, the design of the present invention is effective in preventing the connecting parts from being subjected to a undesirable concentration of stress at one specific location thereof. Instead, the rear swingarm 26 of the present invention achieves smooth distribution of stress over the entire area of the rear swingarm 26 during use on a preferred vehicle.

When the rear swingarm 26 is cast, sand can be removed from sand molds via the sand stripping shake-out holes 61 and 64 at the front and rear ends of the swingarm 26. Since the inner wall 51 has a smoothly curved surface, the axle holders 41 defining a relatively narrow space are free from any roughened portions that are not desirable in order to remove sand. This enables smooth removal of sand, and improves forming efficiency of the rear swingarm 26 when it is cast.

The present invention is not limited to the foregoing embodiment but can be modified in a variety of ways. For instance, the front and rear walls 50 and 52 are not always required to be curved but may be formed straight. The rear swingarm of the present invention is applicable to various other vehicle types including motorcycles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle rear swingarm, comprising:
   a right arm member having a front end and a rear end;
   a left arm member having a front end and a rear end;
   a front cross member having a first end and a second end, said first end abutting said right arm member at said front end thereof and said second end abutting said left arm member at said front end thereof;
   a rear cross member having a first end and a second end, said first end abutting said right arm member at said rear end thereof and said second end abutting said left arm member at said rear end thereof;
   an opening being formed between said front and rear members and said right and left arm members, said opening having a width where said front member abuts said right and left arm members greater than a width where said rear member and said right and left arm members abut,
   wherein right and left sides of said opening are constituted by inner walls of said right and left arm members, said inner walls being uniformly rounded along at least a length portion thereof.

2. The vehicle swingarm as set forth in claim 1, wherein each of said right and left arm members increases in width towards said rear cross member, whereby this increase in width of said right and left arm members contributes to a shape of said opening.

3. The vehicle swingarm as set forth in claim 1, wherein said front and rear arm members and said front and rear cross members are integrally cast as one integral member.

4. The vehicle swingarm as set forth in claim 1, wherein said opening is formed in an essentially oval shape, said opening having an end thereof being curved and having another end being defined by a straight portion.

5. The vehicle swingarm as set forth in claim 1, wherein said front cross member has a front wall facing in a direction of said rear cross member and said rear cross member has a rear wall facing in a direction of said front cross member, said front wall having a first predetermined curvature and said rear wall having a second predetermined curvature.

6. The vehicle swingarm as set forth in claim 5, wherein said first curvature is greater than said second curvature.

7. The vehicle swingarm as set forth in claim 5, wherein each of said inner walls have a third predetermined curvature being greater than each of said first and second curvatures.

8. The vehicle swingarm as set forth in claim 7, wherein each of said third predetermined curvatures are equal.

9. The vehicle swingarm as set forth in claim 1, wherein said right and left arm members are hollow over at least a length portion thereof and have substantially equal height along an length thereof.

10. The vehicle swingarm as set forth in claim 1, wherein said front cross member is hollow and has a pair of pivots extending in a direction away from said rear cross member, said pivots being integrally cast members of said front cross member.

11. The vehicle swingarm as set forth in claim 10, wherein said cross member includes a front surface being opposite of said front wall, said front surface connecting said pivots and having an essentially V shape, wherein an apex of said V shape is directionally facing said rear cross member.

12. The vehicle swingarm as set forth in claim 11, wherein said front surface includes at least one sand removal hole being defined therein, wherein said at least one sand removal hole extends through said front cross member and is open to said right and left arm members.

13. The vehicle swingarm as set forth in claim 1, wherein said rear cross member is hollow and has a pair of axle holders extending in a direction away from said front cross member, said axle holders being integrally cast members of said rear cross member.

14. The vehicle swingarm as set froth in claim 13, wherein said axle holders are substantially cylindrical and extend through said rear cross member along a length thereof, said axle holders having an eccentricity adjuster being rotatably housed in said axle holder in order to facilitate adjustment of an axle positional therein.

15. The vehicle swingarm as set forth in claim 14, wherein said axle holders include a front partition having another sand mold removal hole defined therethrough, said sand removal hole defining a hollow passage between said right and left arm members and said axle holders.

16. The vehicle swingarm as set forth in claim 1, wherein said swingarm is applied to a four-wheeled buggy.

\* \* \* \* \*